(12) United States Patent
Svetlik, III

(10) Patent No.: US 8,187,472 B1
(45) Date of Patent: May 29, 2012

(54) SYSTEM TO ENHANCE AND CONTROL THE PRESSURIZATION, OPERATING PRESSURES, AND FLUSHING OF DRIP DISPERSAL SYSTEMS

(76) Inventor: Rudy James Svetlik, III, Tomball, TX (US)

( * ) Notice: Subject to any disclaimer, the term of this patent is extended or adjusted under 35 U.S.C. 154(b) by 527 days.

(21) Appl. No.: 12/384,078

(22) Filed: Mar. 31, 2009

Related U.S. Application Data

(60) Provisional application No. 61/072,444, filed on Mar. 31, 2008.

(51) Int. Cl.
*C02F 3/30* (2006.01)
*C02F 1/00* (2006.01)

(52) U.S. Cl. ............. 210/747.1; 210/747.9; 210/170.08; 210/333.01; 210/408; 210/108; 210/130; 210/605

(58) Field of Classification Search ........................ None
See application file for complete search history.

(56) References Cited

U.S. PATENT DOCUMENTS

| | | | | |
|---|---|---|---|---|
| 4,139,471 A * | 2/1979 | Foti | ............ | 210/170.06 |
| 5,133,622 A * | 7/1992 | Hewlett | ............ | 405/39 |
| 5,200,065 A * | 4/1993 | Sinclair et al. | ............ | 210/104 |
| 5,597,477 A * | 1/1997 | Harry, III | ............ | 210/86 |
| 5,667,670 A * | 9/1997 | Drewery | ............ | 210/86 |
| 5,766,475 A * | 6/1998 | Mayer et al. | ............ | 210/605 |
| 5,984,574 A * | 11/1999 | Sinclair | ............ | 405/43 |
| 6,309,539 B1 * | 10/2001 | Mayer | ............ | 210/86 |
| 2008/0277357 A1* | 11/2008 | Svetlik, III | ............ | 210/798 |

* cited by examiner

*Primary Examiner* — Krishnan S Menon
(74) *Attorney, Agent, or Firm* — Thompson & Knight LLP; James J. Murphy

(57) ABSTRACT

A drip disposal system includes a fluid source including a pump for cyclically pumping fluid from the fluid source, a set of drip field lines connected to the fluid source for dispersing at least some fluid provided by the source across an area of ground, and a return line for returning fluid not dispersed by the set of drip field lines to the fluid source. A blow-out valve is connected to the return line for controlling fluid flow through the return line during each cycle, the blow-out valve opening when a pressure of the fluid flowing through the return line exceeds a selected minimum pressure and closing when the pressure of the fluid flowing through the return line goes below the selected minimum pressure.

7 Claims, 1 Drawing Sheet

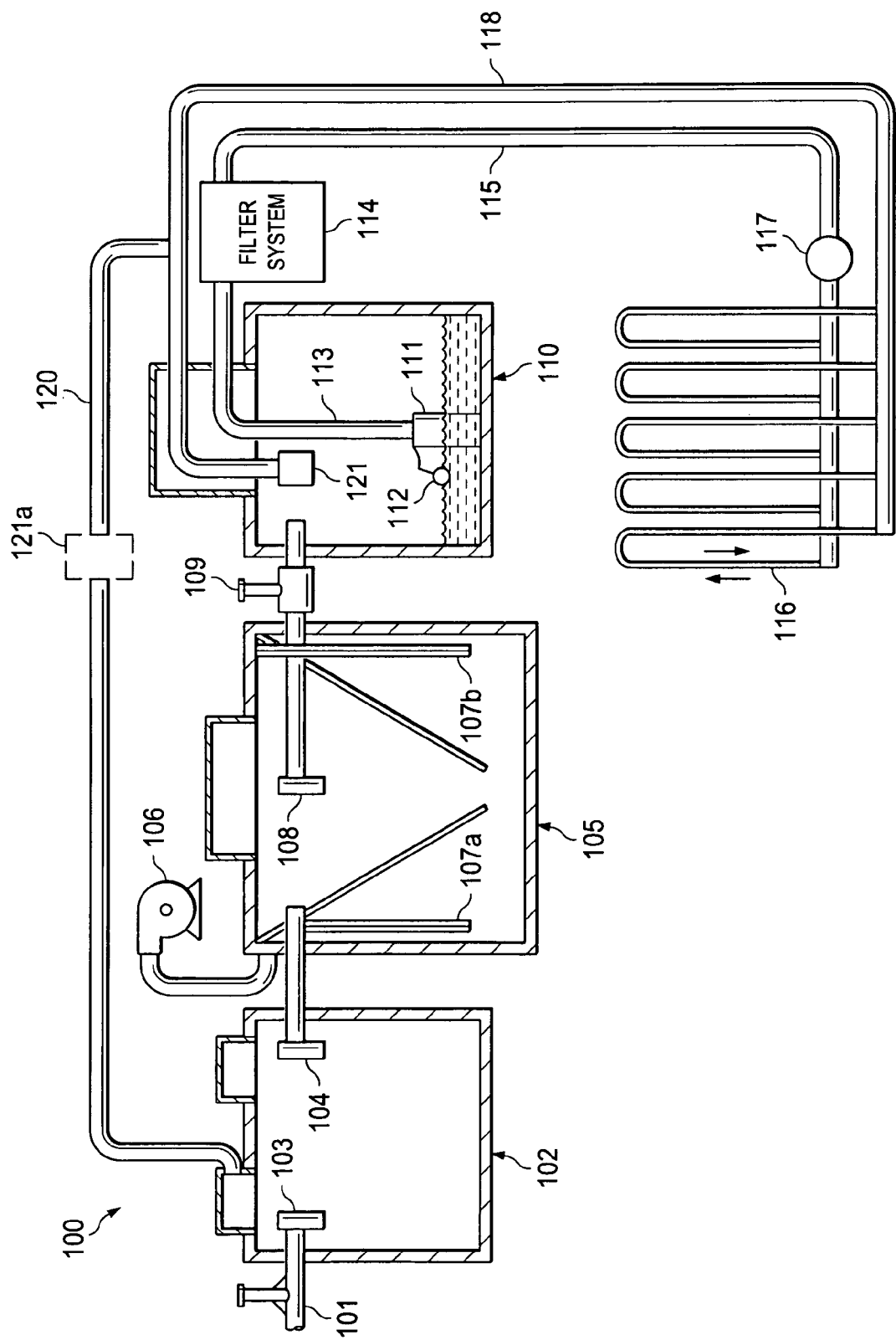

SYSTEM TO ENHANCE AND CONTROL THE PRESSURIZATION, OPERATING PRESSURES, AND FLUSHING OF DRIP DISPERSAL SYSTEMS

CROSS-REFERENCE TO RELATED DATA

This application claims the benefit of U.S. Provisional Application No. 61/072,444 filed Mar. 31, 2008.

FIELD OF INVENTION

The present invention relates in general to septic/waste water recovery techniques, and in particular, to a system to enhance and control the pressurization, operating pressures, and flushing of drip dispersal systems.

BACKGROUND OF INVENTION

Wastewater drip dispersal systems utilize tubing with small drip emitters to disperse wastewater into the soil. The emitters operate properly within a defined pressure range. If the pressure is too high, the tubing and connections can be damaged and, if the pressure is low, the emitters will not function properly. The effluent pressure in the tubing is currently regulated by one of a number of methods, each of which presents its own problems.

In one method, the effluent pressure in the tubing is regulated by utilizing rigid design parameters. However, rigid design parameters are sometimes difficult to meet during installation of system due to actual field conditions. According to another method, the effluent pressure in the tubing is regulated with a pressure regulator installed in the supply header between the pump and the tubing. In this case the pressure regulator regulates pressure by restricting flow, which does not allow the excess flow to be used for cleaning the tubing through a continuous flushing action.

Furthermore, the effluent in the tubing can be regulated by means of a manually adjusted bypass valve installed in either the supply header or the return header. This valve is generally a pvc ball-valve manually set to retain the desired pressure in the tubing while allowing any excess flow to bypass back to the source tank. Here, if pump or filter conditions cause pressure fluctuation then the operation of the manually operated ball-valve setting becomes incorrect and creates either high- or low-pressure situations. Moreover, at the beginning of a dosing cycle, the drip tubing needs to pressure up quickly in order to ensure even distribution through the tubing emitters. A manually preset ball-valve hinders quick pressurization because it allows a continuous bypass of the effluent at all pressure ranges.

SUMMARY OF INVENTION

The principles of the present invention are embodied in a field flush system which incorporates a pressure relief valve ("blow out valve") into a field-flush return line. This blow out valve serves as a pressure regulator, a pressure retainer, and a continuous field-flush controller, as well as a relief valve preset at or near the minimum operating pressure of the drip tubing emitters.

When the minimum operating pressure is reached, the blow out valve opens and allows all flow above what is required to maintain minimum field operating pressure to bypass to the source tank or location of choice. Advantageously, this ensures that the emitters can function as designed while allowing all excess flow to be used continuously to flush the tubing. The blow-out valve closes at pressures near and/or below minimum field operating pressure, such that will quick pressurization of the drip tubing at the beginning of the dosing cycle is ensured. This feature advantageously also serves as a back-pressure regulator to regulate field pressure from the return end of system flow rather than from the source, such that the system is not adversely affected by pressure changes at the pump end of the system.

BRIEF DESCRIPTION OF DRAWINGS

For a more complete understanding of the present invention, and the advantages thereof, reference is now made to the following descriptions taken in conjunction with the accompanying drawings, in which:

FIG. 1 is a diagram of a wastewater drip dispersal system embodying the principles of the present invention.

DETAILED DESCRIPTION OF THE INVENTION

The principles of the present invention and their advantages are best understood by referring to the illustrated embodiment depicted in FIG. 1 of the drawings, in which like numbers designate like parts.

FIG. 1 is a diagram of an exemplary septic/waste water recovery system 100 suitable for describing one particular application of the principles of the present invention, although these principles can be applied to a wide range of other fluid filtering systems.

As shown in FIG. 1A, system 100 includes an effluent input line 101, which receives effluent from the drains of a house or small commercial concern. This effluent enters a trash tank 102 through trash tank inlet 103. Generally, the effluent remains in trash tank 102 while organic solids settle-out. After settling, the remaining liquid effluent in trash tank 102 is transferred through outlet 104 and inlet 107, using either pumping or gravity flow, into aerobic tank 105, where a pump 106 pumps air into the effluent to help break down any remaining organic matter. A secondary aerobic treatment is optional.

Next, the effluent in aerobic tank 105 is transferred using either pumping or gravity flow through outlet 108 and an optional chlorinator 109 and into holding tank 110. An irrigation pump 111, controlled by a float 112, pumps fluid from holding tank 110 through a line 113 to filter system 114. Filter system 114, which embodies the principles of the present invention, will be described in further detail below. In the preferred embodiment, float 112 enables the operation of irrigation pump 111 when sufficient fluid resides at the bottom of holding tank 110. In addition, irrigation pump 111 includes a timer, such that when irrigation pump 111 is enabled by float 112, irrigation pump 111 periodically pumps fluid through filter system 114 for a predetermined amount of time (i.e. a dosing cycle).

In system 100, the filtered water pumped through filter system 114 passes through a line or pipe 115 to drip irrigation field lines 116 (i.e. the disposal field in this example). In the illustrated embodiment, a back-flush valve/vacuum break 117 is provided between line 115 and drip irrigation field lines 116. Return water flows through line or pipe 118 back into holding tank 110. An additional line, 120, allows water, which is used in the filter back-flushing operations and which potentially contains organic contaminates, to be returned to trash tank 102.

System 100, and in particular filter system 114, is described in co-pending U.S. patent application Ser. No.

11/801,252, to Rudy Svetlik for Filtering Systems with Integral Filter Back-flushing, filed May 8, 2007 and incorporated herein by reference.

According to the principles of the present invention, system 100 further includes a pressure relief (blow-out) valve 121 in line 119 returning water to holding tank 110. (Alternatively, a blow-out valve 121a may be disposed in line 120 returning water to trash tank 102). Blow-out valve 121 is preferably a spring check valve, although other types of valves may also be used.

Blow-out valve 121 serves as a pressure regulator, a pressure retainer, and a continuous field-flush controller. More specifically, blow-out valve 121 functions as a relief valve preset at or near the minimum operating pressure of the drip tubing emitters. In a typical embodiment of system 100, blow-out valve 121 may start to open at approximately 8 psi, be fully open at approximately 10 psi, and close again at approximately 8 psi. The actually opening and closing pressures are dependent of the specific requirements for the system.

When the minimum operating pressure is reached during a given dosing cycle, valve 121 opens, which allows all flow above what is required to maintain minimum field operating pressure to bypass to source tank or location of choice (e.g. trash tank 102). This ensures that the emitters can function as designed while allowing all excess flow to be used continuously to flush the tubing. At the end of the dosing cycle, pump 111 stops pumping and the fluid pressure in the system falls. Once the pressure goes below the minimum pressure set for blow-out 121, blow-out valve 121 closes. Since blow-out valve 121 is closed at pressures near and/or below minimum field operating pressure, it will help with the quick pressurization of the drip tubing at the beginning of the dosing cycle. This feature also serves as a back-pressure regulator to regulate field pressure from the return end of system flow rather than from the source and will not be adversely affected by pressure changes at the pump end of the system.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of controlling fluid flow in a drip disposal system comprising:
   cyclically pumping fluid from a fluid source to a set of drip field lines to disperse at least some of the fluid pumped from the fluid source during each cycle across an area of ground;
   returning fluid not dispersed by the set of drip field lines to a return destination at the fluid source; and
   controlling fluid flow through the return line with a blow-out valve, the blow-out valve starting to open when an increasing pressure of the fluid flowing through the return line during each cycle exceeds a selected minimum pressure and closing when a decreasing pressure of the fluid flowing through the return line reaches the selected minimum pressure, wherein the selected minimum pressure is selected to be at or near a minimum operating pressure of emitters of the drip field lines.

2. The method of claim 1, wherein returning fluid to a return destination comprises returning fluid to the fluid source.

3. The method of claim 1, wherein the fluid source comprises a holding tank and returning fluid to a return destination comprises returning fluid to another tank.

4. The method of claim 1, wherein the fluid source comprises a source tank of a septic system.

5. The method of claim 4, wherein the return destination comprises the source tank of the septic system.

6. The method of claim 4, wherein the return destination comprises a trash tank of the septic system.

7. The method of claim 1, further comprising filtering fluid pumped from the fluid source to the set of drip field lines.

* * * * *